United States Patent [19]

Klein et al.

[11] Patent Number: 4,522,952
[45] Date of Patent: Jun. 11, 1985

[54] PROCESS FOR THE FLUORINATION OF POLYMERS, AND PERFLUORINATED ION EXCHANGERS

[75] Inventors: Joachim Klein, Brunswick; Hartmut Widdecke, Bokensdorf; Frank Döscher; Fritz Pohl, both of Brunswick, all of Fed. Rep. of Germany

[73] Assignee: Hoechst Aktiengesellschaft, Frankfurt am Main, Fed. Rep. of Germany

[21] Appl. No.: 550,054

[22] Filed: Nov. 8, 1983

Related U.S. Application Data

[63] Continuation of Ser. No. 276,929, Jun. 24, 1981, abandoned.

[30] Foreign Application Priority Data

Jun. 24, 1980 [DE] Fed. Rep. of Germany ....... 3023455

[51] Int. Cl.$^3$ ................................ C08F 8/20
[52] U.S. Cl. ..................... 521/31; 525/356
[58] Field of Search ............................ 521/31; 525/356

[56] References Cited

U.S. PATENT DOCUMENTS

| | | | |
|---|---|---|---|
| 3,884,885 | 5/1975 | Grot | 525/360 |
| 4,076,916 | 2/1978 | Lagow | 525/356 |
| 4,296,151 | 10/1981 | Boultinghouse | 525/356 |

FOREIGN PATENT DOCUMENTS

| | | | |
|---|---|---|---|
| 2345672 | 3/1975 | Fed. Rep. of Germany | 525/356 |
| 52-4489 | 1/1977 | Japan | 521/30 |
| 2031906 | 9/1979 | United Kingdom | 521/31 |

Primary Examiner—Joseph L. Schofer
Assistant Examiner—Peter F. Kulkosky
Attorney, Agent, or Firm—Curtis, Morris & Safford

[57] ABSTRACT

The present invention relates to a process for preparation of a highly fluorinated polymer by converting a polymer containing the recurring unit $R-S'-X_m$, in which R denotes a base unit forming the matrix, X denotes identical or different functional groups, with the exception of halogen, and S' is an aromatic or araliphatic radical with $m+1$ free valencies, m being at least 1, into a highly fluorinated polymer by fluorination with elementary fluorine. The process is particularly useful for the preparation of cation exchangers, such as those which contain the unit

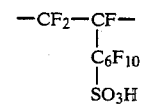

in which $C_6F_{10}$ represents a perfluorinated cyclohexyl ring.

1 Claim, No Drawings

PROCESS FOR THE FLUORINATION OF POLYMERS, AND PERFLUORINATED ION EXCHANGERS

This application is a continuation of Ser. No. 276,929 filed June 24, 1981 and now abandoned.

The invention relates to a process for converting polymers, which contain functional groups, into highly fluorinated polymers by treatment with elementary fluorine.

Fluorinated polymers are distinguished by a high stability to heat and a high chemical stability towards oxidizing agents, such as, for example, hydrogen peroxide. The acidity of acid groups in the polymer is increased by fluorination such that polymers with sulfonic acid groups have an increased catalytic activity, especially in non-aqueous media, compared with conventional cation exchangers with sulfonic acid groups.

It is known that cation exchangers with a fluorohydrocarbon base matrix can be obtained by polymerization of the corresponding fluoro-monomers and subsequent hydrolsis of the product (U.S. Pat. No. 3,770,567 and U.S. Pat. No. 3,884,885). However, polymerization of fluoro-monomers containing relatively large functional groups is impeded for steric reasons. Moreover, synthesis of the monomers and subsequent polymerization thereof lead to a large number of complex reaction steps, so that the resulting fluoro-polymer can only be obtained with difficulty.

It is known, from French Patent Specification No. 1,453,455, to fluorinate polymers, such as, for example, polystyrene, chlorinated polystyrene or copolymers of styrene, butadiene and acrylonitrile, in the presence of a liquid fluorohydrocarbon. However, the extent fluorination achieved is very unsatisfactory rendering quality of the product poor.

It is further known, from U.S. Pat. No. 4,076,916, to subject linear polymers, such as polyacrylates and polymethacrylates, to fluorination with elementary fluorine and then to hydrolyze the products to give the free perfluorinated polycarboxylic acid stage. The perfluorination of functional crosslinked polymerbeads, which is highly desirable, cannot be achieved in this way. Subsequent introduction of a nucleophilic functional group into fluorinated linear polystyrene is known from U.S. Pat. No. 3,793,266. Degree of functionalization, however, is poor with respect to technical application.

Accordingly, a need exits for an improved process for the fluorination of polymers with functional groups.

A process has now been found for converting a polymer containing the recurring unit $R-S'-X_m$, in which R denotes a base unit forming the matrix, X denotes identical or different functional groups, with the exception of halogen, and S' denotes an organic radical with $m+1$ free valencies, m being at least 1, into a highly fluorinated polymer by fluorination with elementary fluorine, which comprises using a polymer in which S' is an aromatic or araliphatic group.

The radical R can be inorganic or organic. Organic radicals, and in particular saturated radicals, are preferred. However, unsaturated radicals which are formed, for example, in the polymerization of substituted butadienes are also possible. The radicals R can be linear or branched or crosslinked with one another in the polymer. The polymers employed do not have to be homopolymers. For example, it is possible for copolymers of styrene with acrylonitrile and butadiene or vinyl chloride or trifluorochloroethylene to be fluorinated according to the invention if these polymers have functional groups. Preferably, at least 25% of the carbon atoms of R carry aromatic or araliphatic groups. Substitution products of polystyrene are particularly preferred.

If copolymers with maleic anhydride are employed, carboxylic acid groups can additionally be produced by hydrolysis after the fluorination. Examples of R which may be mentioned are the following radicals, linked in the 1,2-position:

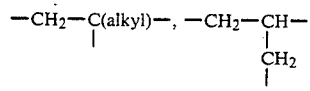

and, in particular, the radical

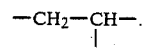

Examples of the functional group X are the monovalent radicals OH, OCH$_3$, COOH, COH, NO$_2$ and SO$_2$F. Acid radicals (carboxylic acids and sulfonic acids) or derivatives of acid groups (salts, acid halides and acid anhydrides) are preferred. Acid fluorides, in particular sulfonyl fluorides, are also very suitable.

Examples of the group S' are the aromatic radicals

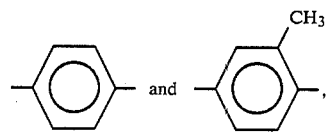

and the araliphatic radicals

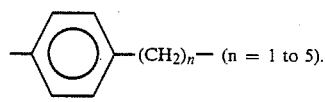

In the latter case, the functional group X can be either on the aromatic ring or on a methylene group. Fluorine-free polymers containing these radicals and sulfonic acid radicals as functional groups X can be obtained if, for example, sultones are allowed to react with polymers which contain aryl groups. These processes are treated in detail in Macrom. Chem. Rapid. Commun. 1 297–302 (1980). The polymers thus obtained can be fluorinated according to the invention.

Non-fluorinated polymers in which S' represents the group

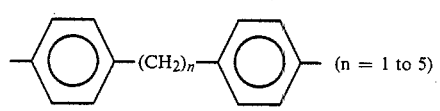

can be prepared in a similar manner.

An aromatic ring on the group S' can also be polysubstituted by X. Examples in this context are the groups

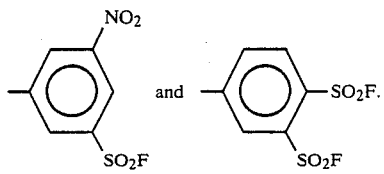

On the other hand, it is not necessary for all the aromatic rings of the starting polymer R—S—$X_m$ to be substituted by functional groups X. However, it is preferable for at least 50% of the aromatic rings to carry a substituent X.

The process according to the invention is preferably carried out as a gas/solid reaction. For this reaction, the polymer matrix is reacted in a stream of gaseous fluorine (which is initially also diluted with an inert gas, such as helium or nitrogen).

It has proved advantageous to start the fluorination initially with very dilute fluorine at low temperatures and to end it with pure fluorine at somewhat higher temperatures. It is particularly advantageous to start the reaction under normal pressure and to use pure fluorine under increased pressure, for example under a pressure of 1.5–5 bars, in the last third of the fluorination period.

The process according to the invention in many cases proceeds slowly. The degree of fluorination therefore is a function of time. If the polymers employed are in the form of films, the reaction products can also be obtained in the form of films. This is important if synthesis of film-like fluorinated cation exchangers with sulfonic acid groups is desired. It is preferable for at least 90%, but in particular at least 95%, of the hydrogen atoms in the polymer employed to be replaced by fluorine in the reaction products of the process according to the invention.

In the case of fluorination of derivatives of polystyrenesulfonic acid, it has been found that the groups

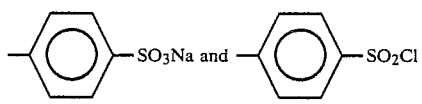

lead to products which have a marked tendency to decompose in solvents, In contrast, polymers containing the structural element

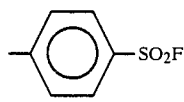

can easily be reacted, the corresponding perfluorinated cation exchanger being obtained after subsequent hydrolysis of the sulfonyl fluoride group. Preferred ion exchangers are polymers which are built up from the units

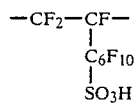

in which $C_6F_{10}$ denotes a perfluorinated cyclohexyl ring.

The perfluorinated products can be used in the form of powders, films, beads and the like; the preferred form of the applied C,H-polymer represents a resin in bead form which has a significant inner surface (macroporous) and which is insoluble in organic liquids because of its crosslinking. The fluorination process does not change the bead form and the mechanical stability of the polymer.

The invention is illustrated in more detail by the examples.

EXAMPLE 1

(a) Introduction of the $So_2F$ group into the matrix 15 g of a crosslinked styrene/divinylbenzene resin (commercially available macroporous, in bead form and diameter of about 1 mm) are pre-swollen in 80 ml of $CCl_4$, and 30 ml of $FSO_3H$ are then added, with cooling. After 15 hours at 60° C., the mixture is worked up and a polymer product with sulfonyl fluoride groups on the ring is obtained (weight: 26.6 g). On the basis of IR measurements, predominantly p-substitution is present.

(b) Fluorination 4 g of the resulting polymer with sulfonyl fluoride groups are introduced into a reactor; after the reactor has been evacuated, thermostatically controlled at −48° C. and flushed with $N_2$, a stream of $F_2$ gas diluted with $N_2$ is passed through the polymer material. The initial volume concentration of the stream is less than 2% and is gradually increased from 2% to 100% of $F_2$ over a period of about 100 hours. The resulting white resin in bead form weighs 8.3 g and has an F content of 51% and an H content of less than 1%, and its size and mechanical stability of the crosslinked polymer is not changed.

(c) Hydrolysis

After hydrolysis of the product with 1N aqueous NaOH and conversion into the H form, the exchange capacity is about 1 milliequivalent/g.

(d) Analysis

Elementary analysis also shows that the functional group is retained during the fluorination. The IR spectra furthermore show the disappearance of the C–H bands at 2,900–3,000 $cm^{-1}$ and the intense C–F vibration at 1,400–1,000 $cm^{-1}$.

(e) Use

The resin exhibits a high catalytic activity in the alkylation of phenol with isobutene or benzene with propene.

EXAMPLE 2

The sulfofluorinated styrene/divinylbenzene resin obtained in Example 1a is introduced into a reactor; after the reactor has been evacuated, thermostatically controlled at −48° C. and flushed with $N_2$, a stream of $F_2$ gas which has been diluted with $N_2$ is passed through the polymer material. The initial volume concentration of the stream of gas is less than 2% and is gradually increased from below 2% to 100% at the given temperature over a period of about 100 hours; the reactor temperature is then increased from −48° C. to +20° C. and the pressure of the pure fluorine gas in the reactor is increased from normal pressure to about 2.5 kg/$cm^2$ for about 60 hours.

The continuous intensification of the reaction conditions can be seen from the following table:

| Time from the start of the experiment (hrs.) | Amount of F₂ in the gas (% by volume) | Reaction temperature (°C.) | Pressure (bar) |
| --- | --- | --- | --- |
| 25 | 1.8 | −48° C. | 1.0 |
| 40 | 3 | " | " |
| 60 | 6 | " | " |
| 70 | 10 | " | " |
| 80 | 15 | " | " |
| 90 | 30 | " | " |
| 100 | 45 | " | " |
| 115 | 100 | " | " |
| 130 | 100 | +20° C. | " |
| 140 | 100 | " | 2.5 |
| 200 | 100 | " | " |

(end of the experiment)

The fluorinated polymer contains 67% by weight of F and 0.5% by weight of H.

We claim:

1. A process for preparing a perfluorinated cation exchanger consisting essentially of contacting a polymer with elemental fluorine in the absence of liquid solvent said polymer containing a repeating unit R—S'—Xm wherein R is a base unit forming a polymer matrix, X represents the radical $SO_2F$, S' is an aromatic or araliphatic radical with m+1 free valences and m is at least 1 to form a perfluorinated acid derivative and converting it into its corresponding free acid or an alkali metal salt thereof by treatment with water or an alkali metal salt thereof.

* * * * *